(12) United States Patent
Kawashima et al.

(10) Patent No.: US 8,563,633 B2
(45) Date of Patent: *Oct. 22, 2013

(54) LIGNOPHENOL DERIVATIVE, RESIN COMPOSITION, AND RESIN MOLDED ARTICLE

(75) Inventors: Manabu Kawashima, Kanagawa (JP); Kenji Yao, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,919

(22) Filed: Jul. 31, 2012

(65) Prior Publication Data

US 2013/0203901 A1   Aug. 8, 2013

(30) Foreign Application Priority Data

Feb. 6, 2012 (JP) ................................. 2012-023532

(51) Int. Cl.
  *C08K 5/134* (2006.01)
  *C07G 1/00* (2011.01)
(52) U.S. Cl.
  USPC ........................................... 524/72; 530/502

(58) Field of Classification Search
  USPC ............................................ 524/72; 530/502
  See application file for complete search history.

(56) References Cited

U.S. PATENT DOCUMENTS

2008/0125544 A1   5/2008   Yao

FOREIGN PATENT DOCUMENTS

| JP | A-2004-115736 | 4/2004 |
| JP | B2-3654527 | 6/2005 |
| JP | A-2008-133368 | 6/2008 |
| JP | B2-4135760 | 8/2008 |
| JP | A-2010-95488 | 4/2010 |
| JP | A-2011-1502 | 1/2011 |
| JP | A-2011-42640 | 3/2011 |

*Primary Examiner* — John Uselding
(74) *Attorney, Agent, or Firm* — Oliff & Berridge, PLC

(57) ABSTRACT

A compound includes a lignophenol derivative having a weight average molecular weight in a range of 5000 to 10000, and satisfying the following formula (1):

$$3.0 \leq pH\ value \leq 4.5 \quad (1)$$

wherein the pH value is a determined value for a liquid mixture containing 0.2 g of the lignophenol derivative added to 40 ml of pure water.

17 Claims, 1 Drawing Sheet

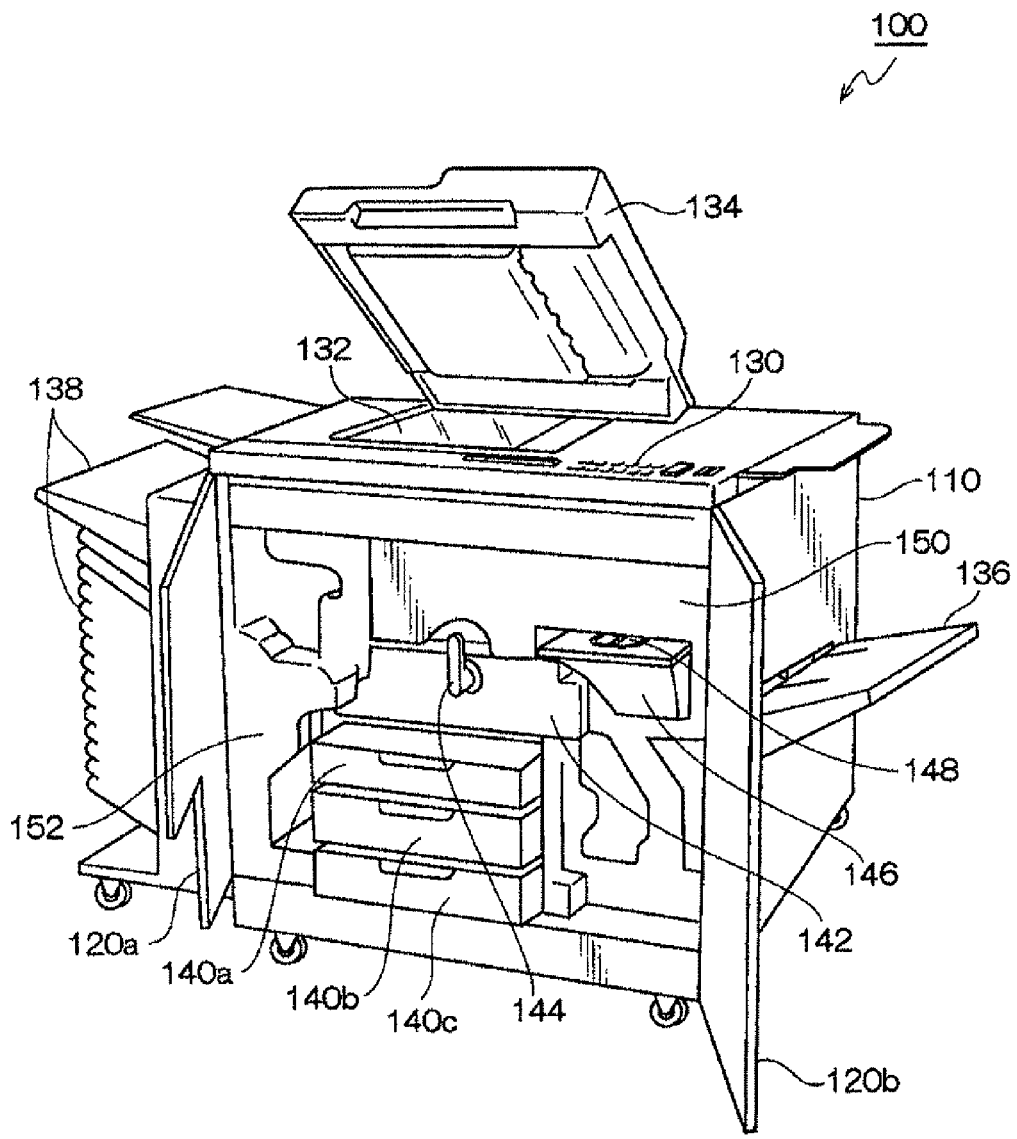

LIGNOPHENOL DERIVATIVE, RESIN COMPOSITION, AND RESIN MOLDED ARTICLE

CROSS-REFERENCE TO RELATED APPLICATIONS

This application is based on and claims priority under 35 USC 119 from Japanese Patent Application No. 2012-023532 filed Feb. 6, 2012.

BACKGROUND

1. Technical Field

The present invention relates to a lignophenol derivative, a resin composition, and a resin molded article.

2. Related Art

A lignophenol derivative obtained from plants is a material attracting attention as one candidate for a non-petroleum resin material from the viewpoint of reducing environmental impact.

SUMMARY

According to an aspect of the invention, there is provided a compound including a lignophenol derivative having a weight average molecular weight in a range of 5000 to 10000, and satisfying the following formula (1):

$$3.0 \leq \text{pH value} \leq 4.5 \tag{1}$$

wherein the pH value is a determined value for a liquid mixture containing 0.2 g of the lignophenol derivative added to 40 ml of pure water.

BRIEF DESCRIPTION OF THE DRAWINGS

Exemplary embodiment of the present invention will be described in detail based on the following figures, wherein:

FIG. 1 is a diagram showing an example of a component of an electronic or electrical device having a molded article according to the present exemplary embodiment.

DETAILED DESCRIPTION

Hereinafter, the lignophenol derivative, the resin composition in which the lignophenol derivative is used, and the resin molded article according to the exemplary embodiment will be described in detail.

Lignophenol Derivative

The lignophenol derivative according to the exemplary embodiment has a weight average molecular weight in a range of 5000 to 10000, and satisfies the following formula (1):

$$3.0 \leq \text{pH value} \leq 4.5 \tag{1}$$

wherein the pH value is a determined value for a liquid mixture containing 0.2 g of the lignophenol derivative added to 40 ml of pure water.

Thus far, a material that is derived from plant lignocellulose obtained without using a chemical polymerization method and has favorable hot workability has been desired, and, furthermore, there has been another demand for high heat and moisture resistance. As a lignophenol derivative, a material that has a lignin-intrinsic 3-dimensional complex crosslinking structure, is excellent in terms of hot workability even with the 3-dimensional structure being maintained, and may obtain high heat and moisture resistance is desired.

In contrast to the above, the lignophenol derivative according to the exemplary embodiment has a weight average molecular weight in the above range and a pH value is controlled to be in the above range in a liquid mixture to which the lignophenol derivative is added. The lignophenol derivative satisfying the above configuration is excellent in terms of hot workability, and, furthermore, hot workability is excellent even in a resin composition in which the lignophenol derivative and a resin are mixed. In addition, in a resin molded article including the lignophenol derivative, favorable moist heat resistance is realized.

The mechanism is not clear, but assumed as follows. That is, the fact that the pH value is controlled to be in the above range in a liquid mixture to which the lignophenol derivative is added indicates that an acid incorporated during the manufacturing process of the lignophenol derivative is removed, and an ionic functional group represented by a sulfo group is reduced. Therefore, it is assumed that the lignophenol derivative in which the acid is removed and the ionic functional group is reduced suppresses decomposition of a resin in a resin composition during a hot process or under a hot and humid environment, the hot workability is excellent as described above, and high heat and moisture resistance is obtained.

pH Value

The lignophenol derivative according to the exemplary embodiment has a pH value of 3.0 to 4.5 in a liquid mixture resulting from adding 0.2 g of the lignophenol derivative to 40 ml of pure water. In a case in which the pH value is less than the above lower limit, the resin decomposes during kneading, and thus favorable hot workability may not be obtained. On the other hand, in a case in which the pH value exceeds the above upper limit, it becomes necessary to chemically modify lignophenol, which impairs an advantage of use of a natural product-derived low environmental impact material.

The pH value is more preferably from 3.1 to 4.1.

For measurement of the pH value, the pH of the liquid mixture is measured at room temperature (26° C.) using D-54 (trade name, manufactured by Horiba Ltd.) as a measurement apparatus.

Further, in a case in which the pH value is measured from the resin molded article, firstly, the lignophenol derivative is separated from the resin molded article using a method of separation or the like through high-performance liquid chromatography (HPLC), the separated lignophenol derivative is mixed with pure water at the above ratio, and then the pH is measured.

Weight Average Molecular Weight

The lignophenol derivative according to the exemplary embodiment has a weight average molecular weight of 5000 to 10000. In a case in which the weight average molecular weight is equal to or greater than the above lower limit, the heat and moisture resistance is excellent, and favorable impact resistance may be obtained. In a case in which the weight average molecular weight is equal to or less than the above upper limit, the heat and moisture resistance is also excellent, and favorable impact resistance may be obtained.

The weight average molecular weight is more preferably from 6000 to 8500.

Mw/Mn

For the lignophenol derivative according to the exemplary embodiment, the ratio Mw/Mn of the weight average molecular weight (Mw) to the number average molecular weight (Mn) is preferably 2 to 6. When the Mw/Mn is the above upper limit or less, variation in resin characteristics is suppressed. On the other hand, when the Mw/Mn is the above lower limit or more, the number of processes that adjust the molecular weight is suppressed so that environmental impact may be reduced.

Here, the weight average molecular weight and the number average molecular weight are measured through gel permeation chromatography (GPC).

In the exemplary embodiment, the molecular weight is measured through GPC using a GPO HLC-8120 manufactured by Tosoh Corporation as a measurement apparatus, a TSKgel Super HM-M column (15 cm) manufactured by Tosho Corporation, and tetrahydrofuran (THF) solvent. The weight average molecular weight and the number average molecular weight are calculated using a molecular weight calibration curve which is prepared based on the measurement results using monodispersed polystyrene standard samples.

(Further, "n" in the respective formulae representing lignophenol derivatives which will be described below is obtained by dividing the weight average molecular weight measured through the above method by the molecular weight of a repetition unit.)

Ratio [(S)/(P)]

The lignophenol derivative according to the exemplary embodiment preferably satisfies the following formula (2):

$$0.07 \leq (S)/(P) \leq 1.15 \qquad (2)$$

wherein (S) presents a peak area of peak wavelengths derived from a phenolic hydroxyl group in a range of 8.7 ppm to 9.4 ppm, and (P) presents a peak area of peak wavelengths derived from a phenol skeleton in a range of 6.0 ppm to 7.7 ppm in $^1$H-NMR. When [(S)/(P)] is within the above range, excellent flame resistance may be obtained, impact resistance is excellent, and favorable moist heat resistance may be achieved. When the amount of the hydroxyl group in the lignophenol derivative according to the embodiment is made to be at a certain level or more as described above, properties beyond expectation are obtained in a resin molded article formed using the lignophenol derivative, and the above effects are achieved.

Structure of Lignophenol Derivative

Next, the structure of the lignophenol derivative according to the exemplary embodiment will be described. The lignophenol derivative is a polymer, and has a structure represented by the following formula (3):

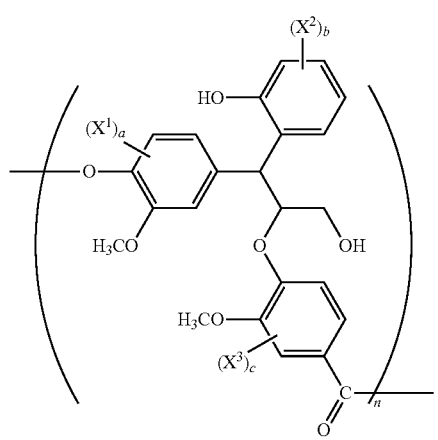

In the above formula (3), $X^1$, $X^2$, and $X^3$ each independently represent a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group.

Further, when $X^1$, $X^2$, and $X^3$ are each a substituted alkyl group, a substituted alkoxy group, a substituted aryl group, or a substituted arylene group, examples of the substituents include a hydroxyl group, a carboxyl group, a carboxyl acid derivative group, an alkyl group, an alkoxy group, and the like.

In addition, in formula (3), a and c each independently represent an integer of from 0 to 3, b represents an integer of from 0 to 4, and n represents an integer of from 10 to 28.

More preferable examples of the lignophenol derivative represented by formula (3) include lignophenol derivatives represented by the following formulae (4) to (6).

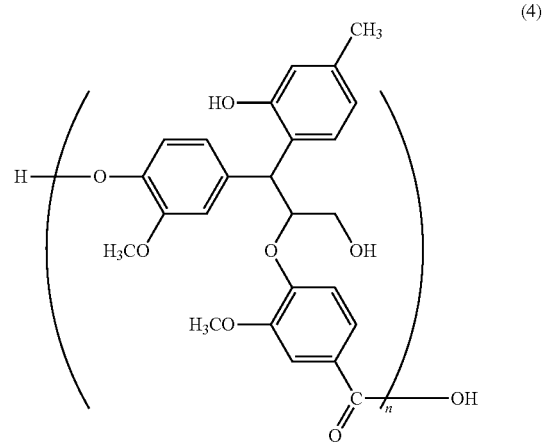

(In formula (4), n represents an integer of from 13 to 26.)

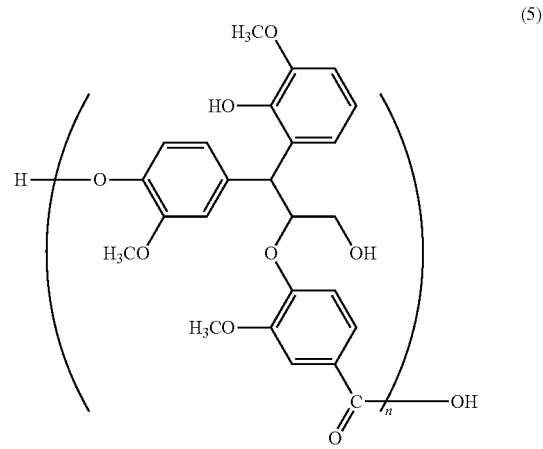

(In formula (5), n represents an integer of from 12 to 25.)

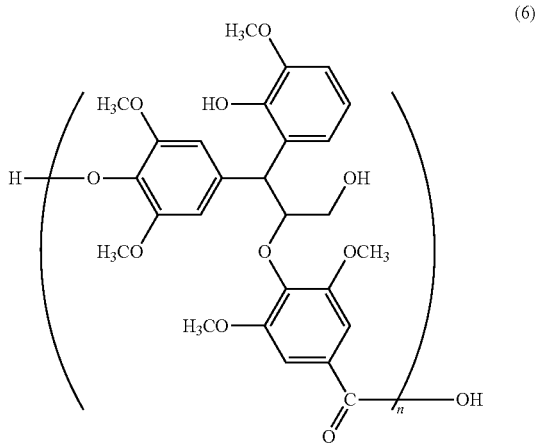

(6)

(In formula (6), n represents an integer of from 11 to 22.)

The lignophenol derivative represented by formula (3) may be a unitary structure or a mixture of two or more kinds of different structures. Meanwhile, the lignophenol derivative represented by formula (3) is a polymer mixture, and n in formula (3) refers to an average value of n for the entire polymer mixture.

Method of Synthesizing Lignophenol Derivative

Examples of a method of synthesizing the lignophenol derivative according to the exemplary embodiment include a method in which lignin included in a plant resource is separated in a converted form of a lignophenol derivative, extracted, and made to have hydroxyl groups by hydrating the terminal ends or carboxylated through an oxidizing reaction in which natural ketone is used. There is a case in which the structure of the lignophenol derivative obtained by such a manufacturing method varies depending on differences in the plant resource, such as softwoods or hardwoods, but there is no problem with the characteristics.

Hereinafter, the method of synthesizing the lignophenol derivative will be described in detail using an example.

Separation Process

Chips of a plant resource, such as Japanese cypress material, are immersed in acetone and dried so as to be delipidated. p-Cresol is added to the delipidated chips, the mixture is stirred, next, sulfuric acid is added, the mixture is stirred, then, distilled water is added, the mixture is stirred, p-cresol in the upper layer is separated and collected using decantation, p-cresol is added dropwise to stirred diethyl ether, and the obtained sediment is collected through centrifugal separation.

Rinsing Process

Next, rinsing is performed for the collected sediment.

Specifically, the collected sediment is put and dispersed in stirred distilled water, the distilled water is removed through centrifugal separation, and the sediment is collected.

Further, when the degree of the rinsing is adjusted so that the pH value is controlled in the lignophenol derivative, more specifically, ionic impurities included in lignin (for example, a sulfo group obtained in a process of preparing a lignophenol derivative) are removed and neutralized, whereby the pH value in the above range is achieved.

Reprecipitation Process

Next, the rinsed sediment is dissolved in acetone, impurities are filtered, then, the solution is added dropwise to the stirred diethyl ether layer, and the sediment is reprecipitated, thereby obtaining a lignophenol derivative.

Further, the weight average molecular weight or Mw/Mn in the lignophenol derivative is adjusted, and the weight average molecular weight, that is, the degree of polymerization, is adjusted by adjusting the number of repetitions of the processes of dissolution, filtration, and reprecipitation, whereby the ratio [(S)/(P)] of the peak area (S) of peak wavelengths derived from a phenolic hydroxyl group to the peak area (P) of peak wavelengths derived from a phenol skeleton is adjusted.

End Group-Denaturing Process

Further, the end group may be denatured by dissolving the lignophenol derivative obtained through reprecipitation in methyl ethyl ketone, heating the solution, and stirring the solution with methanol and tetrabutoxy titanium added thereto.

Further, for modification of the lignophenol derivative, that is, introduction of a substituent represented by $X^1$, $X^2$, and $X^3$ in formula (3), a compound having an active hydroxyl group corresponding to $X^1$, $X^2$, or $X^3$ is made to react at highly active C—H portions in a benzene ring in the lignophenol derivative, thereby being bonded through a self catalyst action. A lignophenol derivative modified to have a desired functional group may be obtained by making an aliphatic alcohol act in a case in which the lignophenol derivative is modified to have an alkyl group, or making a phenol in the case of an aryl group and a benzyl alcohol in the case of an arylene group act in a case in which the lignophenol derivative is modified to have an alkoxy group. The reaction is a stirring reaction performed in a solvent, such as methyl ethyl ketone or acetone, under a temperature condition of room temperature (26° C.) to 150° C.

In addition, in a case in which the lignophenol derivative (polymer) according to the exemplary embodiment has a structural unit represented by formula (3) and another structural unit, a polyester structure, such as an aliphatic polyester structure; a polycarbonate structure, an aromatic polyester structure, a polyamide structure, a polyolefin structure, such as polypropylene or polyethylene; a polystyrene structure, a polyacrylate structure, a polybutadiene structure, or copolymer structures thereof may be used as the other structural unit, and, among the above, an aliphatic polyester structure is preferable. In this case, the polymer may be any of a block copolymer and a random copolymer.

In the lignophenol derivative (polymer) according to the exemplary embodiment, the proportion of the structural units represented by formula (3) in the entire structural units is preferably from 5 mol % to 100 mol %, and more preferably from 10 mol % to 100 mol %.

Resin Composition

The resin composition according to the exemplary embodiment contains a resin and the lignophenol derivative according to the exemplary embodiment.

Further, the content of the lignophenol derivative according to the exemplary embodiment is preferably from 0.1 part by weight to 40 parts by weight with respect to 100 parts by weight of the resin.

Resin

In the resin composition according to the exemplary embodiment, a well-known thermoplastic resin in the related art, such as polyester, such as aliphatic polyester, or polycarbonate, may be used as the resin in combination with the lignophenol derivative, and, among the above, aliphatic polyester is preferable.

Meanwhile, in a case in which the lignophenol derivative according to the exemplary embodiment and aliphatic polyester as another resin are used in combination, excellent heat resistance and mechanical strength are obtained. The reason thereof is assumed to be that the phenol activity of the lignophenol derivative according to the exemplary embodiment and the activity of the end group reaction group react with the unreacted end of the aliphatic polyester in a temperature range of kneading, injection molding, or the like so that partial crosslinking or molecular chain extension occurs.

Aliphatic Polyester

The aliphatic polyester is not particularly limited, and examples thereof include hydroxycarboxylic acid polymers and polycondensation products between aliphatic diols and aliphatic carboxylic acids.

Specific examples of the aliphatic polyester include polylactate, poly-3-hydroxybutyrate, polyhydroxy hexanate, polyhydroxyvalerate, copolymers thereof, polybutylene succinate, polybutylene adipate, polyethylene succinate, polyethylene adipate, copolymers of two or more kinds thereof, and the like.

The aliphatic polyester may be used singly or in combination of two or more kinds.

The aliphatic polyester may be, for example, a single continuous member (for example, polyhydroxybutyrate), polylactate formed of a mixture of L and D optical isomers, or copolymerized with the optical isomer.

Among the above, preferably aliphatic polyester includes polylactate, polyhydroxy butyrate, polybutylene succinate, and copolymers of two or more kinds.

The weight average molecular weight of the aliphatic polyester is not particularly limited; however, for example, preferably from 8000 to 150000, and more preferably from 20000 to 100000.

In a case in which the resin composition according to the exemplary embodiment contains the aliphatic polyester, the content of the aliphatic polyester is preferably from 5% by weight to 80% by weight, and more preferably from 10% by weight to 50% by weight of the total amount of the resin composition.

In addition, a resin other than the aliphatic polyester may be used.

Examples of the resin include well-known thermoplastic resins in the related art, and specifically include polycarbonate resins, polypropylene resins, polyamide resins, aromatic polyester resins, polyolefin resins, polyester carbonate resins, polyphenylene ether resins, polyphenylene sulfide resins, polysulfone resins, polyether sulfone resins, polyarylene resins, polyether imide resins, polyacetal resins, polyvinyl acetal resins, polyketone resins, polyether ketone resins, polyether ether ketone resins, polyaryl ketone resins, polyether nitrile resins, liquid crystal resins, polybenzoimidazole resins, polyparabanic acid resins, vinyl polymer or copolymer resins which are obtained by polymerizing or copolymerizing one or more kinds of vinyl monomers selected from a group consisting of an aromatic alkenyl compound, a methacrylic acid ester, an acrylic acid ester, and a cyanated vinyl compound, diene-aromatic alkenyl compound copolymer resins, cyanated vinyl-diene-aromatic alkenyl compound copolymer resins, aromatic alkenyl compound-diene-cyanated vinyl-N-phenyl maleimide copolymer resins, cyanated vinyl-(ethylene-diene-propylene (EPDM))-aromatic alkenyl compound copolymer resins, polyolefins, vinyl chloride resins, chlorinated vinyl chloride resins, and the like.

The resin may be used singly or in combination of two or more kinds.

Flame Retardant

In addition, since the resin composition according to the exemplary embodiment contains the lignophenol derivative according to the exemplary embodiment, the resin composition has excellent flame resistance, but may further contain a flame retardant other than the above components.

The flame retardant includes a bromine-based flame retardant, a phosphorous-based flame retardant, a silicone-based retardant, an inorganic particle-based flame retardant, and the like. Among the above retardants, the phosphorous-based retardant, the silicone-based retardant, and the inorganic particle-based retardant are preferable. Preferable examples of the flame retardant include phosphorous-based flame retardants, such as phosphate ester-based, condensed phosphoric acid ester-based, phosphorous polyester polymer-based flame retardants; silicone-based flame retardants, such as silicone powder and silicone resins; inorganic particle-based flame retardants, such as aluminum hydroxide and magnesium hydroxide; and the like.

Among the above, phosphate ester is preferable. The lignophenol derivative according to the exemplary embodiment has many benzene rings in the structure, phosphate ester is added and favorably dispersed by using phosphate ester as the flame retardant that is used in combination with the lignophenol derivative, and excellent flame resistance is achieved.

Condensed Phosphate Ester

Examples of the condensed phosphate ester include bisphenol A-type, bisphenylene-type, isophthalene-type, and other aromatic condensed phosphate esters, and specific examples include condensed phosphate esters represented by the following formula (7) or (8).

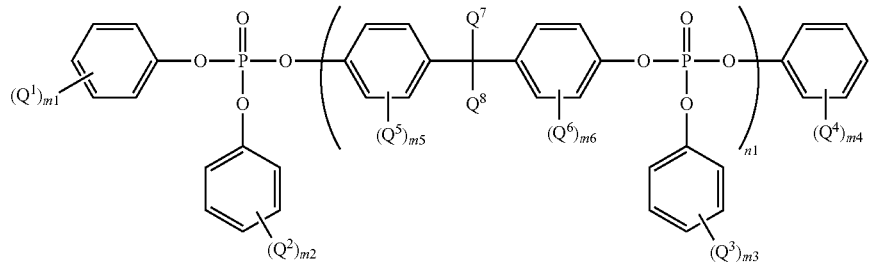

(7)

In formula (7), $Q^1$, $Q^2$, $Q^3$, and $Q^4$ each independently represent a hydrogen atom or an alkyl group having from 1 to 6 carbon atoms, $Q^5$, $Q^6$, $Q^7$, and $Q^8$ each independently represent a hydrogen atom or a methyl group, m1, m2, m3, and m4 each independently represent an integer of from 0 to 3, m5 and m6 each independently represent an integer of from 0 to 2, and n1 represents an integer of from 0 to 10.

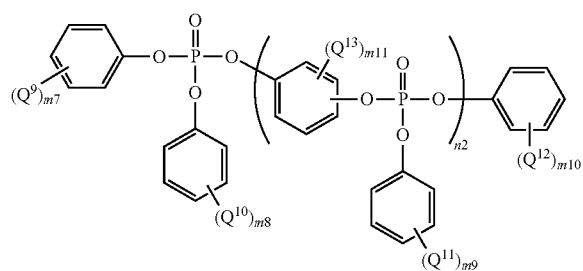

(8)

In formula (8), $Q^9$, $Q^{10}$, $Q^{11}$, and $Q^{12}$ each independently represent a hydrogen atom or an alkyl group having from 1 to 6 carbon atoms, $Q^{13}$ represents a hydrogen atom or a methyl group, m7, m8, m9, and m10 each independently represent an integer of from 0 to 3, m11 represents an integer of from 0 to 4, and n2 represents an integer of from 0 to 10.

The condensed phosphate ester may be a synthesized product or a commercially available product. Specific examples of the commercially available product of the condensed phosphate ester include commercially available products manufactured by Daihachi Chemical Industry Co., Ltd. ("PX200," "PX201," "PX202," "CR741," and the like), commercially available products manufactured by Adeka Corporation ("ADEKA STAB FP2100," "FP2200," and the like), and the like.

Among the above, the condensed phosphate ester is preferably at least one kind selected from compounds represented by the following structural formula (9) (for example, "PX200" manufactured by Daihachi Chemical Industry Co., Ltd.) and compounds represented by the following structure formula (10) (for example, "CR741" manufactured by Daihachi Chemical Industry Co., Ltd.).

The content of the flame retardant is preferably from 1% by weight to 30% by weight, and more preferably from 3% by weight to 25% by weight of the total amount of the resin composition.

In addition, particularly, in a case in which a phosphate ester is used as the flame retardant, the phosphate ester is preferably included at 10 parts by weight to 40 parts by weight with respect to 100 parts by weight of the resin.

Examples of additives other than the flame retardant include an oxidation inhibitor, a toughening agent, a compatibilizing agent, a weather resistance agent, a hydrolysis inhibitor, a catalyst, and the like. The content of each of the additives is preferably 5% by weight or less of the total amount of the resin composition.

Method of Manufacturing Resin Composition

The resin composition according to the exemplary embodiment is manufactured by melt-kneading a mixture of the above components.

Further, a well-known apparatus may be used for mixing or melt-kneading, and examples thereof include a biaxial extruder, a Henschel mixer, a Banbury mixer, a monaxial screw extruder, a multiaxial screw extruder, a co-kneader, and the like.

Molded Article

The molded article according to the exemplary embodiment is constituted by including the lignophenol derivative according to the exemplary embodiment.

Specifically, the molded article according to the exemplary embodiment may be obtained by, for example, molding the resin composition according to the exemplary embodiment using a molding machine. Meanwhile, examples of the molding method in which a molding machine is used include injection molding, extrusion molding, blow molding, hot pressing molding, calender molding, coating molding, casting molding, dipping molding, vacuum molding, transfer molding, and the like.

Structural Formula (9)

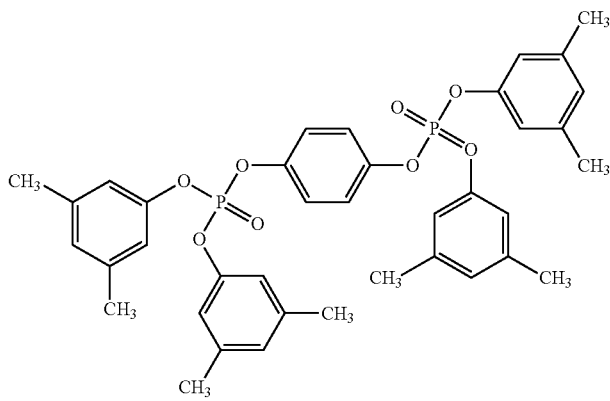

Structural Formula (10)

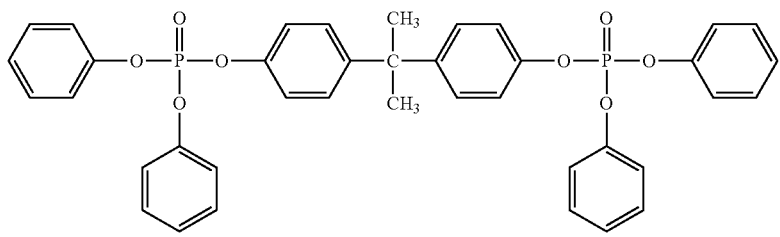

Here, the injection molding may be performed using a commercially available apparatus, for example, an NEX150 manufactured by Nissei Plastic Industrial Co., Ltd., an NEX70000 manufactured by Nissei Plastic Industrial Co., Ltd., an SE50D manufactured by Toshiba Machine Co., Ltd., or the like.

At this time, the cylinder temperature is preferably from 170° C. to 280° C., and more preferably from 180° C. to 270° C. In addition, the mold temperature is preferably from 40° C. to 110° C., and more preferably from 50° C. to 110° C.

The molded article according to the exemplary embodiment is preferably used for electronic and electrical devices, home appliances, vessels, car interior materials, and the like. More specifically, the molded article is used for chassis of home appliances, electronic and electrical devices, and the like, a variety of components, wrapping films, housing cases of CD-ROMs or DVDs, dishes, food trays, beverage bottles, chemical wrapping materials, and the like, and is preferably used for components of electronic and electrical devices.

FIG. 1 is a perspective view of the front appearance of an image forming apparatus which is an example of a component of an electronic and electrical device having the molded article according to the exemplary embodiment.

The image forming apparatus 100 in FIG. 1 has front covers 120a and 120b on the front surface of a main body apparatus 110. The front covers 120a and 120b may be opened and closed so that an operator may perform operations in the apparatus. Thereby, the operator may refill the toner when the toner is consumed, change a consumed process cartridge, and remove jammed paper when paper jamming occurs in the apparatus. FIG. 1 shows the apparatus in a state in which the front covers 120a and 120b are opened.

An operation panel 130 on which a variety of conditions regarding image formation, such as paper size or the number of copies, are inputted through operation by the operator and a copy glass plate 132 on which an original document to be scanned is disposed are provided on the top surface of the main body apparatus 110. In addition, the main body apparatus 110 has an automatic original document transporting apparatus 134 that transports the original document on the copy glass plate 132 at the top portion thereof. Furthermore, the main body apparatus 110 has an image scanning apparatus that scans the original document image disposed on the copy glass plate 132 so as to obtain image data expressing the original document image. The image data obtained using the image scanning apparatus are sent to an image forming unit through a control portion. Meanwhile, the image scanning apparatus and the control portion are housed inside a chassis 150 that composes a part of the main body apparatus 110. In addition, the image forming unit is included in the chassis 150 as a detachable process cartridge 142. The process cartridge 142 may be attached and detached by rotating an operation lever 144.

A toner accommodating portion 146 is attached to the chassis 150 of the main body apparatus 110, and a toner is replenished through a toner supply opening 148. The toner housed in the toner accommodating portion 146 is supplied to a developing apparatus.

Meanwhile, paper accommodating cassettes 140a, 140b, and 140c are provided at the bottom portion of the main body apparatus 110. In addition, in the main body apparatus 110, plural sets of transportation rollers composed of a pair of rollers are arrayed so that a transportation path through which the paper in the paper housing cassette is transported to the image forming unit present on the top portion is formed. Meanwhile, the paper in each of the paper housing cassettes is extracted one sheet at a time through a paper extracting mechanism disposed at the end portion of the transportation path, and sent out to the transportation path. In addition, a manual paper supplying portion 136 is provided at the side surface of the main body apparatus 110, and paper is also supplied therefrom.

Paper on which images are formed using the image forming unit is sequentially transported between two fixing rolls that are supported by a chassis 152 composing a part of the main body apparatus 110 and are in contact with each other, and then is ejected outside the main body apparatus 110. The main body apparatus 110 has plural paper ejecting portions 138 on a side opposite to the side on which the paper supplying portion 136 is provided, and image-formed paper is ejected to the paper ejecting portions.

In the image forming apparatus 100, the molded article according to the exemplary embodiment is used for, for example, the front covers 120a and 120b, the exterior of the process cartridge 142, the chassis 150, and the chassis 152.

EXAMPLES

Hereinafter, the invention will be described specifically using examples, but the invention is not limited to the examples. Further, in the following, "parts" and "%" are based on weight unless particularly otherwise described.

Synthesis of Lignophenol Derivative (A)

Separation Process

Japanese cypress material powder is made to pass through a 20-mesh sieve, 10 parts of chips that have passed through the sieve is immersed in acetone for 20 hours, dried under vacuum at 80° C. for 8 hours, and delipidated. p-Cresol (50 parts) is added to the delipidated chips, stirred at room temperature (26° C.) for 4 hours, then, 50 parts of 78%-concentrated sulfuric acid is added, and stirred at 30° C. for 60 minutes. After that, 1000 parts of distilled water is added, stirred, the p-cresol in an upper layer is separated and collected using decantation, the p-cresol is added dropwise to 1000 parts of stirred diethyl ether, and obtained sediment is collected through centrifugal separation.

Rinsing Process

Next, the collected sediment is rinsed.

Specifically, 10 parts of the collected sediment is put and dispersed in 300 parts of stirred distilled water, and then the distilled water is removed through centrifugal separation, thereby collecting the sediment. The rinsing process is repeated 6 times, and the sediment is collected.

Reprecipitation Process

Next, 10 parts of the rinsed sediment is dissolved in 200 parts of acetone, the undissolved portion is filtered using filter paper with a retained particle diameter of 1 μm, added dropwise to a layer of 1000 parts of stirred diethyl ether, and reprecipitated. The dissolution, filtration, and reprecipitation process is repeated 3 times, thereby obtaining a lignophenol derivative (A).

The measurement results of the weight average molecular weight Mw (polystyrene-converted), number average molecular weight Mn (polystyrene-converted), [Mw/Mn], pH value in a liquid mixture containing 0.2 g of the lignophenol derivative (A) added to 40 ml of pure water, and ratio [(S)/(P)] of the peak area (S) of peak wavelengths derived from a phenolic hydroxyl group (8.7 ppm to 9.4 ppm) to the peak area (P) of peak wavelengths derived from a phenol skeleton (6.0 ppm to 7.7 ppm) in $^1$H-NMR of the lignophenol derivative (A) (a polymer mixture of the lignophenol derivative) are shown in Table 1.

Synthesis of Lignophenol Derivative (B)

A lignophenol derivative (B) is obtained through the above method except that the number of repetitions of the rinsing process is changed to 3 times, and the number of repetitions of the reprecipitation process is changed to once in the synthesis of the lignophenol derivative (A).

Synthesis of Lignophenol Derivative (C)

A lignophenol derivative (C) is obtained through the above method except that the stirring time after addition of the 78%-concentrated sulfuric acid is set to 90 minutes in the separation process, and the number of repetitions of the reprecipitation process is changed to twice in the synthesis of the lignophenol derivative (A).

Synthesis of Lignophenol Derivative (D)

A lignophenol derivative (D) is obtained through the above method except that the number of repetitions of the rinsing process is changed to 4 times, and the number of repetitions of the reprecipitation process is changed to twice in the synthesis of the lignophenol derivative (A).

Synthesis of Lignophenol Derivative (E)

A lignophenol derivative (E) is obtained through the above method except that the stirring time after addition of the 78%-concentrated sulfuric acid is changed to 120 minutes in the separation process in the synthesis of the lignophenol derivative (A).

Synthesis of Lignophenol Derivative (F)

A lignophenol derivative (F) is obtained through the above method except that the stirring time after addition of the 78%-concentrated sulfuric acid is set to 30 minutes in the separation process, the number of repetitions of the rinsing process is changed to four times, and the number of repetitions of the reprecipitation process is changed to once in the synthesis of the lignophenol derivative (A).

Synthesis of Lignophenol Derivative (G)

A lignophenol derivative (G) is obtained through the above method except that the stirring time after addition of the 78%-concentrated sulfuric acid is set to 90 minutes in the separation process, the number of repetitions of the rinsing process is changed to twice, and the number of repetitions of the reprecipitation process is changed to twice in the synthesis of the lignophenol derivative (A).

Synthesis of Lignophenol Derivative (H)

A lignophenol derivative (H) is obtained through the above method except that the stirring time after addition of the 78%-concentrated sulfuric acid is set to 30 minutes in the separation process, the number of repetitions of the rinsing process is changed to once, and the number of repetitions of the reprecipitation process is changed to twice in the synthesis of the lignophenol derivative (A).

Synthesis of Lignophenol Derivative (I)

A lignophenol derivative (I) is obtained through the above method except that the stirring time after addition of the 78%-concentrated sulfuric acid is changed to 90 minutes in the separation process, 1 part of sodium hydroxide is added together with 10 parts of the sediment only when the sediment that is yet to undergo the first reprecipitation is put into distilled water in the rinsing process, the number of repetitions of the rinsing process is changed to twice, and the number of repetitions of the reprecipitation process is changed to three times in the synthesis of the lignophenol derivative (A).

TABLE 1

| | Lignophenol derivative | | | | | | | | |
|---|---|---|---|---|---|---|---|---|---|
| | (A) | (B) | (C) | (D) | (E) | (F) | (G) | (H) | (I) |
| Structure | Compound of formula (4), n = 12 | Compound of formula (4), N = 17 | Compound of formula (4), n = 11 | Compound of formula (4), n = 16 | Compound of formula (4), n = 2 | Compound of formula (4), n = 44 | Compound of formula (4), n = 8 | Compound of formula (4), n = 36 | Compound of formula (4), n = 8 |
| Weight average molecular weight (Mw) | 6000 | 8300 | 5500 | 7800 | 1200 | 22000 | 4000 | 18000 | 4200 |
| Number average molecular weight (Mn) | 2200 | 1400 | 1600 | 1400 | 700 | 5300 | 1100 | 4800 | 1900 |
| [Mw/Mn] | 2.7 | 5.9 | 3.4 | 5.5 | 1.7 | 4.2 | 3.6 | 3.8 | 2.2 |
| pH | 4.1 | 3.14 | 4.43 | 3.8 | 4.2 | 3.6 | 2.72 | 2.19 | 6.21 |
| Ratio [(S)/(P)] | 0.09 | 1.12 | 0.07 | 1.15 | 1.2 | 0.05 | 0.1 | 0.07 | — |
| (Note) | Example | | | | Comparative example | | | | |

Examples 1 to 49 and Comparative Examples 1 to 23

Preparation of Resin Composition

Mixtures having the compositions shown in Tables 2 to 6 for examples and mixtures having the compositions shown in Tables 7 and 8 for comparative examples (further, the numeric values of the compositions shown in Tables 2 to 8 indicate parts by weight) are kneaded at the temperatures of a cylinder (the head portion) which are shown in Tables 2 to 8 in a biaxial kneading apparatus (manufactured by Toshiba Machine Co., Ltd., TEM48SS), cooled, and pelletized, thereby obtaining pellet-shape resin compositions.

However, in examples in which flame retardant A, flame retardant B, or flame retardant C is used, the lignophenol derivative and the flame retardant are mixed in advance using a biaxial kneading machine (manufactured by Toyo Seiki Seisakujyo, LABO PLASTOMILL), and then the mixture and a resin, such as polylactate, are kneaded as described above, thereby being shaped into a pellet.

Formation of Resin Molded Article

The obtained resin compositions are put into an injection molder (manufactured by Nissei Plastic Industrial Co., Ltd., NEX150), and molded articles are formed at the temperatures of the cylinder (the head portion) and mold temperatures shown in Tables 2 to 8.

Specifically, the following are formed as the molded articles.
UL test sample for V test in UL-94 (thickness: 2.0 mm)
ISO multipurpose dumbbell test sample (test sample length: 100 mm, width: 10 mm, and thickness: 4 mm)

Evaluation

In the respective examples, the following evaluations are performed on the obtained lignophenol derivatives and molded articles (test samples).

Workability Evaluation

Firstly, a workability evaluation test is performed through the following method.

Specifically, when manufacturing the resin composition, a mixture (compound) is kneaded with a screw rotation speed set to 60 rpm, and whether the apparatus may operate stably, and, furthermore, whether the strand-shaped molten resin ejecting from the nozzle head follows the tensile force of the transportation system and may be pelletized is confirmed.

The evaluation standards are as follows.

A: A pellet is obtained without occurrence of overload and stoppage during kneading.
B: Overload occurs during kneading such that pelletizing stops.
C: A pellet is not obtained due to resin decomposition during kneading.

Appearance test: bleed out (after moist heat test)

Firstly, a "moist heat test" is performed using the following method.

Specifically, an ISO multipurpose dumbbell test sample is put into a constant-temperature and constant-humidity tank (manufactured by Toyo Seiki Seisakujyo, THN042) that is set in an atmosphere of a temperature of 65° C. and a humidity of RH 85% for 400 hours.

Next, after the moist heat test, whether or not bleed occurs on the surface is confirmed, and the appearance is evaluated based on the following standards.

A: Bleed does not occur.
B: Bleed occurs.

Flame resistance test: UL94-V test

A UL-V test is performed using a UL-94 method using a UL test sample for V test. Further, the evaluation standards are V-0, V-1, and V-2 sequentially as the flame resistance weakens, and, in a case in which the flame resistance is poorer than V-2, that is, a case in which the test sample is combusted, notV is indicated.

Charpy Impact Strength Test

A Charpy impact strength ($kJ/m^2$) is measured using a notched ISO multipurpose dumbbell test sample and an impact testing apparatus (manufactured by Toyo Seiki Seisakujyo, DG-5) according to the prescriptions of ISO-179.

Charpy Impact Strength Test (after Moist Heat Test)

The above moist heat test is performed on a notched ISO multipurpose dumbbell test sample, and a. Charpy impact strength ($kJ/m^2$) is measured using the above method after the moist heat test.

TABLE 2

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Polylactate A | | 100 | 100 | 100 | 100 | 100 | 100 | 100 | 100 | 100 | 100 | 100 | 100 |
| Polylactate B | | | | | | | | | | | | | |
| Polyamide | | | | | | | | | | | | | |
| Polycarbonate | | | | | | | | | | | | | |
| Lignophenol derivative | (A) | 0.1 | 0.1 | 0.1 | 1 | 1 | 1 | 5 | 5 | 5 | 5 | 5 | 5 |
| | (B) | | | | | | | | | | | | |
| | (C) | | | | | | | | | | | | |
| | (D) | | | | | | | | | | | | |
| Flame retardant A | | | 15 | 25 | 10 | 15 | 25 | 5 | 10 | 15 | 25 | 40 | 50 |
| Flame retardant B | | | | | | | | | | | | | |
| Flame retardant C | | | | | | | | | | | | | |
| Total | | 100.1 | 115.1 | 125.1 | 111 | 116 | 126 | 110 | 115 | 120 | 130 | 145 | 155 |
| Degree of plant (% by weight) | | 100 | 87 | 80 | 91 | 87 | 80 | 95 | 91 | 88 | 81 | 72 | 68 |
| Resin composition manufacturing cylinder temperature (° C.) | | 190 | 190 | 190 | 190 | 190 | 190 | 190 | 190 | 190 | 190 | 190 | 190 |
| Resin molded article forming cylinder temperature (° C.) | | 185 | 185 | 185 | 185 | 185 | 185 | 185 | 185 | 185 | 185 | 185 | 185 |
| Resin molded article forming mold temperature (° C.) | | 100 | 100 | 100 | 100 | 100 | 100 | 100 | 100 | 100 | 100 | 100 | 100 |
| Workability evaluation | | ○ | ○ | ○ | ○ | ○ | ○ | ○ | ○ | ○ | ○ | ○ | ○ |
| Bleed out (after moist heat test) | | ○ | ○ | ○ | ○ | ○ | ○ | ○ | ○ | ○ | ○ | X | X |
| Flame resistance | | not V | V-0 | V-0 | V-1 | V-0 | V-0 | not V | V-1 | V-0 | V-0 | V-0 | V-0 |
| Impact strength | | 7.8 | 8.9 | 8.2 | 10.2 | 11.1 | 10.9 | 13.5 | 12.1 | 12.1 | 11.5 | 8.9 | 7.6 |
| Impact strength (after moist heat test) | | 5.9 | 6.2 | 5.4 | 8.3 | 8.8 | 8.5 | 11.1 | 9.1 | 8.8 | 8.2 | 6.3 | 5.8 |

TABLE 3

| | Example | | | | | | | | | |
|---|---|---|---|---|---|---|---|---|---|---|
| | 13 | 14 | 15 | 16 | 17 | 18 | 19 | 20 | 21 | 22 |
| Polylactate A | 100 | 100 | 100 | 100 | 100 | 100 | 100 | 100 | 100 | 100 |
| Polylactate B | | | | | | | | | | |
| Polyamide | | | | | | | | | | |
| Polycarbonate | | | | | | | | | | |

TABLE 3-continued

|  |  | Example |  |  |  |  |  |  |  |  |  |
|---|---|---|---|---|---|---|---|---|---|---|---|
|  |  | 13 | 14 | 15 | 16 | 17 | 18 | 19 | 20 | 21 | 22 |
| Lignophenol derivative | (A) | 10 | 10 | 10 | 10 | 40 | 40 | 40 | 40 | 50 | 50 |
|  | (B) |  |  |  |  |  |  |  |  |  |  |
|  | (C) |  |  |  |  |  |  |  |  |  |  |
|  | (D) |  |  |  |  |  |  |  |  |  |  |
| Flame retardant A |  | 10 | 15 | 25 | 40 | 10 | 15 | 25 | 40 | 15 | 25 |
| Flame retardant B |  |  |  |  |  |  |  |  |  |  |  |
| Flame retardant C |  |  |  |  |  |  |  |  |  |  |  |
| Total |  | 120 | 125 | 135 | 150 | 150 | 155 | 165 | 180 | 165 | 175 |
| Degree of plant (% by weight) |  | 92 | 88 | 81 | 73 | 93 | 90 | 85 | 78 | 91 | 86 |
| Resin composition manufacturing cylinder temperature (° C.) |  | 190 | 190 | 190 | 190 | 190 | 190 | 190 | 190 | 190 | 190 |
| Resin molded article forming cylinder temperature (° C.) |  | 185 | 185 | 185 | 185 | 185 | 185 | 185 | 185 | 185 | 185 |
| Resin molded article forming mold temperature (° C.) |  | 100 | 100 | 100 | 100 | 100 | 100 | 100 | 100 | 100 | 100 |
| Workability evaluation |  | ○ | ○ | ○ | ○ | Δ | Δ | Δ | Δ | Δ | Δ |
| Bleed out (after moist heat test) |  | ○ | ○ | ○ | X | ○ | ○ | ○ | X | ○ | ○ |
| Flame resistance |  | V-1 | V-0 | V-0 | V-0 | V-0 | V-0 | V-0 | V-0 | V-0 | V-0 |
| Impact strength |  | 12.8 | 13.5 | 12.3 | 9.7 | 27.2 | 24.6 | 22.4 | 21.2 | 23.8 | 22.1 |
| Impact strength (after moist heat test) |  | 9.3 | 10.5 | 10.1 | 6.9 | 19.5 | 17.2 | 14.1 | 12.4 | 17.1 | 14.2 |

TABLE 4

|  |  | Example |  |  |  |  |  |  |  |
|---|---|---|---|---|---|---|---|---|---|
|  |  | 23 | 24 | 25 | 26 | 27 | 28 | 29 | 30 |
| Polylactate A |  | 100 | 100 | 100 | 100 | 100 | 100 | 100 | 100 |
| Polylactate B |  |  |  |  |  |  |  |  |  |
| Polyamide |  |  |  |  |  |  |  |  |  |
| Polycarbonate |  |  |  |  |  |  |  |  |  |
| Lignophenol derivative | (A) | 1 | 1 | 10 | 10 | 1 | 1 | 10 | 10 |
|  | (B) |  |  |  |  |  |  |  |  |
|  | (C) |  |  |  |  |  |  |  |  |
|  | (D) |  |  |  |  |  |  |  |  |
| Flame retardant A |  |  |  |  |  |  |  |  |  |
| Flame retardant B |  | 15 | 25 | 15 | 25 |  |  |  |  |
| Flame retardant C |  |  |  |  |  | 15 | 25 | 15 | 25 |
| Total |  | 116 | 126 | 125 | 135 | 116 | 126 | 125 | 135 |
| Degree of plant (% by weight) |  | 87 | 80 | 88 | 81 | 87 | 80 | 88 | 81 |
| Resin composition manufacturing cylinder temperature (° C.) |  | 190 | 190 | 190 | 190 | 190 | 190 | 190 | 190 |
| Resin molded article forming cylinder temperature (° C.) |  | 185 | 185 | 185 | 185 | 185 | 185 | 185 | 185 |
| Resin molded article forming mold temperature (° C.) |  | 100 | 100 | 100 | 100 | 100 | 100 | 100 | 100 |
| Workability evaluation |  | ○ | ○ | ○ | ○ | ○ | ○ | ○ | ○ |
| Bleed out (after moist heat test) |  | ○ | ○ | ○ | ○ | ○ | ○ | ○ | ○ |
| Flame resistance |  | V-0 | V-0 | V-0 | V-0 | V-1 | V-0 | V-0 | V-0 |
| Impact strength |  | 11.7 | 11.2 | 13.8 | 12.4 | 10.3 | 9.6 | 11.8 | 10.4 |
| Impact strength (after moist heat test) |  | 8.7 | 8.3 | 10.2 | 9.8 | 7.3 | 6.7 | 7.9 | 8.5 |

TABLE 5

|  |  | Example |  |  |  |  |  |  |  |  |  |
|---|---|---|---|---|---|---|---|---|---|---|---|
|  |  | 31 | 32 | 33 | 34 | 35 | 36 | 37 | 38 | 39 | 40 |
| Polylactate A |  | 100 | 100 | 100 | 100 | 100 | 100 | 100 | 100 | 100 | 100 |
| Polylactate B |  |  |  |  |  |  |  |  |  |  |  |
| Polyamide |  |  |  |  |  |  |  |  |  |  |  |
| Polycarbonate |  |  |  |  |  |  |  |  |  |  |  |
| Lignophenol derivative | (A) |  |  |  |  |  |  |  |  |  |  |
|  | (B) | 0.1 | 1 | 5 | 10 |  |  |  |  |  |  |
|  | (C) |  |  |  |  | 0.1 | 1 | 10 |  |  |  |
|  | (D) |  |  |  |  |  |  |  | 0.1 | 1 | 10 |

TABLE 5-continued

|  | Example | | | | | | | | | |
|---|---|---|---|---|---|---|---|---|---|---|
|  | 31 | 32 | 33 | 34 | 35 | 36 | 37 | 38 | 39 | 40 |
| Flame retardant A | 25 | 25 | 25 | 25 | 25 | 25 | 25 | 25 | 25 | 25 |
| Flame retardant B |  |  |  |  |  |  |  |  |  |  |
| Flame retardant C |  |  |  |  |  |  |  |  |  |  |
| Total | 125.1 | 126 | 130 | 135 | 125.1 | 126 | 135 | 125.1 | 126 | 135 |
| Degree of plant (% by weight) | 80 | 80 | 81 | 81 | 80 | 80 | 81 | 80 | 80 | 81 |
| Resin composition manufacturing cylinder temperature (° C.) | 190 | 190 | 190 | 190 | 190 | 190 | 190 | 190 | 190 | 190 |
| Resin molded article forming cylinder temperature (° C.) | 185 | 185 | 185 | 185 | 185 | 185 | 185 | 185 | 185 | 185 |
| Resin molded article forming mold temperature (° C.) | 100 | 100 | 100 | 100 | 100 | 100 | 100 | 100 | 100 | 100 |
| Workability evaluation | ○ | ○ | ○ | ○ | ○ | ○ | ○ | ○ | ○ | ○ |
| Bleed out (after moist heat test) | ○ | ○ | ○ | ○ | ○ | ○ | ○ | ○ | ○ | ○ |
| Flame resistance | V-0 | V-0 | V-0 | V-0 | V-2 | V-1 | V-1 | V-2 | V-1 | V-1 |
| Impact strength | 8.2 | 10.1 | 11.3 | 12.1 | 6.4 | 6.2 | 5.9 | 4.8 | 4.5 | 4.1 |
| Impact strength (after moist heat test) | 4.3 | 4.7 | 5.5 | 5.7 | 3.6 | 3.5 | 2.8 | 2.8 | 2.2 | 1.8 |

TABLE 6

|  |  | Example | | | | | | | | |
|---|---|---|---|---|---|---|---|---|---|---|
|  |  | 41 | 42 | 43 | 44 | 45 | 46 | 47 | 48 | 49 |
| Polylactate A |  |  |  |  |  |  |  |  |  |  |
| Polylactate B |  | 100 | 100 | 100 | 100 | 100 | 100 | 100 | 100 |  |
| Polyamide |  |  |  |  |  |  |  |  |  | 100 |
| Polycarbonate |  |  |  |  |  |  |  |  |  |  |
| Lignophenol derivative | (A) | 0.1 | 1 | 5 | 10 | 0.1 | 1 | 5 | 10 | 10 |
|  | (B) |  |  |  |  |  |  |  |  |  |
|  | (C) |  |  |  |  |  |  |  |  |  |
|  | (D) |  |  |  |  |  |  |  |  |  |
| Flame retardant A |  | 10 | 10 | 10 | 10 | 25 | 25 | 25 | 25 | 25 |
| Flame retardant B |  |  |  |  |  |  |  |  |  |  |
| Flame retardant C |  |  |  |  |  |  |  |  |  |  |
| Total |  | 110.1 | 111 | 115 | 120 | 125.1 | 126 | 130 | 135 | 135 |
| Degree of plant (% by weight) |  | 91 | 91 | 91 | 91 | 80 | 80 | 81 | 81 | 81 |
| Resin composition manufacturing cylinder temperature (° C.) |  | 190 | 190 | 190 | 190 | 190 | 190 | 190 | 190 | 200 |
| Resin molded article forming cylinder temperature (° C.) |  | 185 | 185 | 185 | 185 | 185 | 185 | 185 | 185 | 200 |
| Resin molded article forming mold temperature (° C.) |  | 100 | 100 | 100 | 100 | 100 | 100 | 100 | 100 | 50 |
| Workability evaluation |  | ○ | ○ | ○ | ○ | ○ | ○ | ○ | ○ | ○ |
| Bleed out (after moist heat test) |  | ○ | ○ | ○ | ○ | ○ | ○ | ○ | ○ | ○ |
| Flame resistance |  | V-1 | V-1 | V-0 | V-0 | V-0 | V-0 | V-0 | V-0 | V-1 |
| Impact strength |  | 9.2 | 10.7 | 12.4 | 13.6 | 8.2 | 10.1 | 11.3 | 12.1 | 6.4 |
| Impact strength (after moist heat test) |  | 6.4 | 8.2 | 9.5 | 9.7 | 5.8 | 8.6 | 8.2 | 10.1 | 4.8 |

TABLE 7

|  |  | Comparative example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Polylactate A |  | 100 | 100 | 100 |  |  |  |  | 100 | 100 | 100 | 100 |
| Polylactate B |  |  |  |  | 100 | 100 |  |  |  |  |  |  |
| Polyamide |  |  |  |  |  |  | 100 |  |  |  |  |  |
| Polycarbonate |  |  |  |  |  |  |  | 40 | 40 |  |  |  |
| Lignophenol derivative | (E) |  |  |  |  |  |  |  |  | 1 | 5 | 10 |
|  | (F) |  |  |  |  |  |  |  |  |  |  |  |
|  | (G) |  |  |  |  |  |  |  |  |  |  |  |
|  | (H) |  |  |  |  |  |  |  |  |  |  |  |
|  | (I) |  |  |  |  |  |  |  |  |  |  |  |

TABLE 7-continued

| | Comparative example | | | | | | | | | | |
|---|---|---|---|---|---|---|---|---|---|---|---|
| | 1 | 2 | 3 | 4 | 5 | 6 | 7 | 8 | 9 | 10 | 11 |
| Flame retardant A | | 5 | 25 | 5 | 25 | 25 | 5 | 25 | 25 | 25 | 25 |
| Flame retardant B | | | | | | | | | | | |
| Flame retardant C | | | | | | | | | | | |
| Total | 100 | 105 | 125 | 105 | 125 | 125 | 145 | 165 | 126 | 130 | 135 |
| Degree of plant (% by weight) | 100 | 95 | 80 | 95 | 80 | 80 | 69 | 60 | 80 | 81 | 81 |
| Resin composition manufacturing cylinder temperature (° C.) | — | 190 | 190 | 190 | 190 | 200 | 230 | 220 | 190 | 190 | 190 |
| Resin molded article forming cylinder temperature (° C.) | 185 | 185 | 185 | 185 | 185 | 200 | 230 | 230 | 185 | 185 | 185 |
| Resin molded article forming mold temperature (° C.) | 100 | 100 | 100 | 100 | 100 | 50 | 50 | 50 | 100 | 100 | 100 |
| Workability evaluation | ○ | ○ | ○ | ○ | ○ | ○ | ○ | ○ | ○ | ○ | ○ |
| Bleed out (after moist heat test) | ○ | ○ | ○ | ○ | ○ | ○ | ○ | ○ | ○ | ○ | ○ |
| Flame resistance | V-2 | V-2 | V-2 | not V | V-2 | not V | not V | V-2 | V-2 | V-2 | V-2 |
| Impact strength | 2.5 | 2.1 | 1.6 | 1.6 | 0.8 | 4.2 | 2.8 | 2.1 | 2.8 | 2.6 | 2.1 |
| Impact strength (after moist heat test) | 1.5 | 1.4 | 1.2 | 1.1 | 0.7 | 3.5 | 1.2 | 0.8 | 2.1 | 1.9 | 1.4 |

TABLE 8

| | | Comparative example | | | | | | | | | | | |
|---|---|---|---|---|---|---|---|---|---|---|---|---|---|
| | | 12 | 13 | 14 | 15 | 16 | 17 | 18 | 19 | 20 | 21 | 22 | 23 |
| Polylactate A | | 100 | 100 | 100 | 100 | 100 | 100 | 100 | 100 | 100 | 100 | 100 | 100 |
| Polylactate B | | | | | | | | | | | | | |
| Polyamide | | | | | | | | | | | | | |
| Polycarbonate | | | | | | | | | | | | | |
| Lignophenol | (E) | | | | | | | | | | | | |
| derivative | (F) | 1 | 5 | 10 | | | | | | | | | |
| | (G) | | | | 1 | 5 | 10 | | | | | | |
| | (H) | | | | | | | 1 | 5 | 10 | | | |
| | (I) | | | | | | | | | | 1 | 5 | 10 |
| Flame retardant A | | 25 | 25 | 25 | 25 | 25 | 25 | 25 | 25 | 25 | 25 | 25 | 25 |
| Flame retardant B | | | | | | | | | | | | | |
| Flame retardant C | | | | | | | | | | | | | |
| Total | | 126 | 130 | 135 | 126 | 130 | 135 | 126 | 130 | 135 | 126 | 130 | 135 |
| Degree of plant (% by weight) | | 80 | 81 | 81 | 80 | 81 | 81 | 80 | 81 | 78 | 80 | 81 | 81 |
| Resin composition manufacturing cylinder temperature (° C.) | | 190 | 190 | 190 | 190 | 190 | 200 | 230 | 220 | 190 | 190 | 190 | 190 |
| Resin molded article forming cylinder temperature (° C.) | | 185 | 185 | 185 | — | — | — | — | — | — | 185 | 185 | 185 |
| Resin molded article forming mold temperature (° C.) | | 100 | 100 | 100 | — | — | — | — | — | — | 100 | 100 | 100 |
| Workability evaluation | | ○ | ○ | ○ | X | X | X | X | X | X | ○ | ○ | ○ |
| Bleed out (after moist heat test) | | ○ | ○ | ○ | — | — | — | — | — | — | ○ | ○ | ○ |
| Flame resistance | | V-1 | V-1 | V-1 | — | — | — | — | — | — | V-2 | V-1 | V-1 |
| Impact strength | | 4.2 | 3.8 | 2.9 | — | — | — | — | — | — | 3.8 | 3.6 | 3.4 |
| Impact strength (after moist heat test) | | 3.2 | 3.6 | 2.1 | — | — | — | — | — | — | 2.2 | 1.8 | 1.5 |

Here, details of the material types in the respective tables are shown.

Aliphatic Polyester

Polylactate A: TERRAMAC TE2000, manufactured by Unitika Limited.

Polylactate B: LACEA II-100, manufactured by Mitsui Chemicals Inc.

Aliphatic Polyamide

Polyamide: Rilsan, manufactured by Arkema Co., Ltd.

Flame Retardant

Flame retardant A: condensed phosphate ester, PX-200, manufactured by Daihachi Chemical Industry Co., Ltd.

Flame retardant B: condensed phosphate ester, CR-741, manufactured by Daihachi Chemical Industry Co., Ltd.

Flame retardant C: ammonium polyphosphate, AP422, manufactured by Clariant GmbH

Other olycarbonate: PANLITE L-1225Y, manufactured by Teijin Kasei America Inc.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A compound comprising:
a lignophenol derivative having a weight average molecular weight in a range of 6000-8,500, and satisfying the following formula (1):

$$3.0 \leq \text{pH value} \leq 4.5 \quad (1)$$

wherein the pH value is a determined value for a liquid mixture containing 0.2 g of the lignophenol derivative added to 40 ml of pure water, wherein: the lignophenol derivative is represented by the following formula (3):

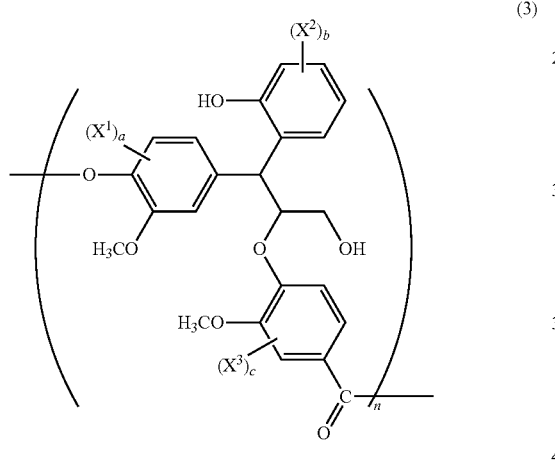

wherein in formula (3), $X^1$, $X^2$, and $X^3$ each independently represent a substituted or unsubstituted alkyl group, a substituted or unsubstituted alkoxy group, a substituted or unsubstituted aryl group, a substituted or unsubstituted arylene group, a hydroxyl group, a carboxyl group, an amino group, or an amide group, a and c each independently represent an integer of from 0 to 3, b represents an integer of from 0 to 4, and n represents an integer of from 10 to 28.

2. The compound according to claim 1,
wherein the lignophenol derivative satisfies the following formula (2):

$$0.07 \leq (S)/(P) \leq 1.15 \quad (2)$$

wherein (S) presents a peak area of peak wavelengths derived from a phenolic hydroxyl group in a range of 8.7 ppm to 9.4 ppm, and (P) presents a peak area of peak wavelengths derived from a phenol skeleton in a range of 6.0 ppm to 7.7 ppm in $^1$H-NMR.

3. The compound according to claim 1,
wherein the lignophenol derivative has a ratio Mw/Mn of the weight average molecular weight (Mw) to the number average molecular weight (Mn) in a range of 2 to 6.

4. The compound according to claim 1,
wherein the lignophenol derivative is a compound selected from the following formulae (4) to (6):

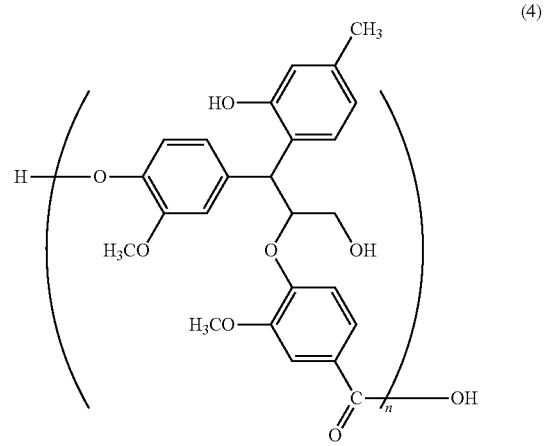

wherein in formula (4), n represents an integer of from 13 to 26;

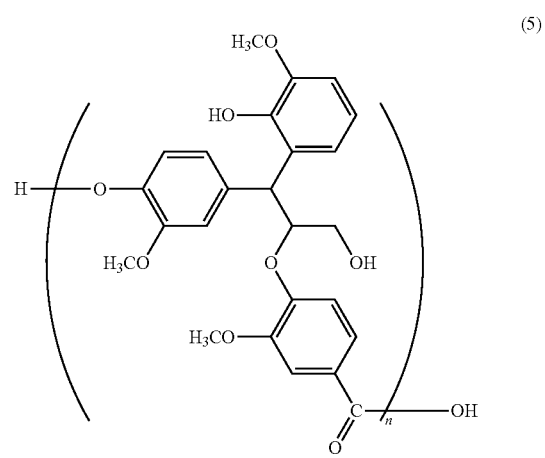

wherein in formula (5), n represents an integer of from 12 to 25;

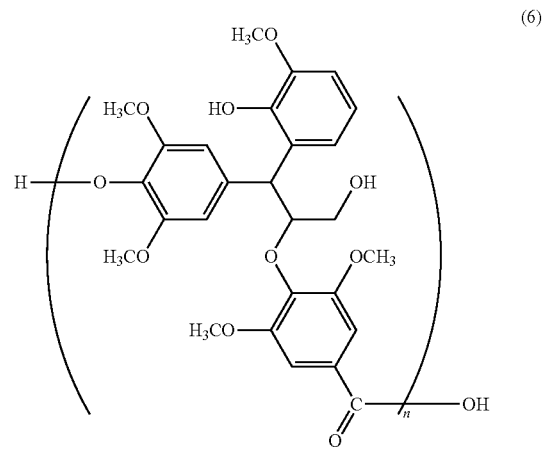

wherein in formula (6), n represents an integer of from 11 to 22.

5. A resin composition comprising:
a resin, and
the compound containing a lignophenol derivative according to claim 1.

6. The resin composition according to claim 5, wherein the resin is aliphatic polyester.

7. The resin composition according to claim 5, wherein the lignophenol derivative is contained in a range of 0.1 part by weight to 40 parts by weight with respect to 100 parts by weight of the resin.

8. The resin composition according to claim 5 further comprising a phosphate ester.

9. The resin composition according to claim 8, wherein the phosphate ester is included in a range of 10 parts by weight to 40 parts by weight with respect to 100 parts by weight of the resin.

10. A resin molded article comprising:
a resin, and
the compound including a lignophenol derivative according to claim 1.

11. The resin molded article according to claim 10, wherein the resin is aliphatic polyester.

12. The resin molded article according to claim 10, wherein the compound is included in a range of 0.1 part by weight to 40 parts by weight with respect to 100 parts by weight of the resin.

13. The resin molded article according to claim 10 further comprising a phosphate ester.

14. The resin molded article according to claim 13, wherein the phosphate ester is included in a range of 10 parts by weight to 40 parts by weight with respect to 100 parts by weight of the resin.

15. The compound according to claim 1, wherein the lignophenol derivative has a weight average molecular weight in the range of 7,800-8,300.

16. The compound according to claim 15, wherein n represents an integer of from 16 to 17.

17. The compound according to claim 1, wherein n represents an integer of from 11 to 17.

* * * * *